United States Patent
Carey

(10) Patent No.: US 6,262,002 B1
(45) Date of Patent: Jul. 17, 2001

(54) SOIL REMEDIATION COMPOSITIONS AND METHOD

(76) Inventor: Charles C. Carey, 142 Dean Rd., Homer, LA (US) 71040

( * ) Notice: Subject to any disclaimer, the term of this patent is extended or adjusted under 35 U.S.C. 154(b) by 0 days.

(21) Appl. No.: 09/373,013

(22) Filed: Aug. 11, 1999

(51) Int. Cl.⁷ ..................................................... C11D 3/60
(52) U.S. Cl. ......................................................... 510/110
(58) Field of Search ............................................. 510/110

(56) References Cited

U.S. PATENT DOCUMENTS

| | | | |
|---|---|---|---|
| 3,167,387 | * 1/1965 | Erner | 23/75 |
| 4,406,688 | * 9/1983 | Konno et al. | 71/92 |
| 5,615,975 | 4/1997 | Wang | 405/128 |
| 5,634,983 | 6/1997 | Kammeraad | 134/25.1 |
| 5,741,750 | 4/1998 | Hall | 502/200 |
| 5,766,929 | * 6/1998 | Orolin et al. | 435/262 |
| 5,811,290 | 9/1998 | Varadaraj | 435/262.5 |
| 5,824,725 | 10/1998 | Lahalih | 524/404 |
| 5,829,691 | 11/1998 | Gaudin | 241/46.01 |
| 5,863,789 | * 1/1999 | Komatsu et al. | 435/262 |

* cited by examiner

Primary Examiner—John Hardee
(74) Attorney, Agent, or Firm—John M. Harrison

(57) ABSTRACT

A liquid composition and method for chemical remediation of eroded soil or oil-damaged vegetation and/or soil. In a preferred embodiment the soil remediation composition is characterized by a homogenous aqueous solution having selected quantities of urea, dimethylsulfoxide (DMSO), hydrated calcium nitrate and an ionic or non-ionic surfactant such as ether sulfate. The composition solution is typically sprayed either full-strength or at a selected dilution on the oil-damaged soil and vegetation or eroded, sparsely-vegetated or oil-damaged soil, and rapidly penetrates the soil to the vegetation roots to cleanse the vegetation and soil, activate hydrocarbon-consuming bacteria in the case of oil spills, and promote plant nitrogen assimilation and rapid growth and ground coverage of vegetation. The treated soil is typically seeded to enhance grass or vegetation growth and coverage. A small quantity of dye is typically added to the composition to color and facilitate uniform visual distribution of the composition over the soil or soil and vegetation. In another embodiment a liquid calcium solution is mixed with the soil remediation composition for neutralizing ground sodium in the remediation of brine or salt water spills.

11 Claims, No Drawings

SOIL REMEDIATION COMPOSITIONS AND METHOD

BACKGROUND OF THE INVENTION

1. Field of the Invention

This invention relates to chemical remediation of eroded soil or oil- or brine-damaged vegetation and/or soil and more particularly, to a soil remediation composition and method of remediating oil- or brine-damaged soil and vegetation or eroded, sparsely-vegetated or damaged soil by applying the liquid composition to the eroded or damaged soil or damaged soil and vegetation, to both cleanse the brine-or oil-stained soil or soil and vegetation and enhance or accelerate vegetation growth and coverage as the composition percolates through the damaged, eroded or sparsely-vegetated soil In a preferred embodiment the soil remediation composition is characterized by a homogenous aqueous solution of water and selected quantities of urea, dimethylsulfoxide (DMSO), hydrated calcium nitrate and an ionic or non-ionic surfactant such as ether sulfate. The liquid composition is typically sprayed on the damaged, eroded or sparsely-vegetated soil or damaged soil and vegetation, either full-strength or at a selected dilution depending on the degree of soil or vegetation damage or soil erosion, and rapidly penetrates the soil to the vegetation roots to both cleanse the soil and vegetation and promote plant nitrogen assimilation and rapid growth and ground coverage of vegetation. The treated soil is typically seeded to enhance vegetation growth and coverage. A small quantity of dye is typically added to the composition to color and facilitate uniform visual distribution of the composition over the soil or soil and vegetation. In the case of wet oil spills, the soil remediation composition activates hydrocarbon-consuming bacteria, and the treated soil is typically tilled or disced using organic matter such as hay before seeding to aerate the soil, enhance soil recovery and prevent soil erosion. In a second embodiment a liquid calcium solution is mixed with the soil remediation composition for neutralizing ground sodium in the treatment of brine or salt water spills.

In recent years the problem of soil contamination has become increasingly acute, prompting federal state and local governments to mandate clean-up of both accidentally and intentionally contaminated soil. Soil contamination is frequently caused by spillage of petroleum hydrocarbons from oil wells or storage tanks, or leakage of salt water from cross-country piping and storage networks utilized in the oil and process industries. Inland oil spills and leakages can cause localized death of agricultural and natural vegetation and extensive soil damage. Accidental influxes of salts to the soil can devastate most vegetation in the spillage area and stop biological activity in a matter of days, rendering the land unproductive for farming or growth of any type of vegetation. Whether the high influxes of sodium chlorides in the soil result from years of irrigation, brackish water usage or an industrial process-related accident, the results are the same: almost all vegetation within the salt-contaminated area dies, and this in turn may also adversely affect the surrounding ecological balance.

Soil or sand erosion is a problem which is particularly severe in geographic areas having arid climates characterized by little rainfall high solar radiation and high rainwater evaporation rates. Soil erosion is usually caused by loose bonding among soil particles, frequently due to lack of vegetation, and the loose soil, susceptible to being blown by the wind, can contribute to sand storms, dust clouds and sand dune movement. Increasing the natural soil vegetation by enabling the existing sparse vegetation to grow would therefore reverse soil erosion by providing a stabilizing network or scaffold for the soil

2. Description of the Prior Art

Several methods and compositions are known in the art for the remediation, cleansing, stabilizing or conditioning of soil. U.S. Pat. No. 5,615,975, dated Apr. 1, 1997, to Hugh H. Wang, et al., describes a "Method for Remediation of Volatile Organic Contaminated Soils" for detoxification and/or chemical remediation of soil contaminated with volatile organic compounds. The process includes treating the soil with the sodium and calcium salts of naphthalene sulfonates and lignosulfonates, as well as with derivatives and mixtures of these chemicals. Consequently, the volatile organic compounds are forced from the soil since the soil is more attracted to the treatment chemicals than to the volatile organic contaminants. A "Method for Soil Remediation" is disclosed in U.S. Pat. No. 5,634,983, dated Jun. 3, 1997, to Norman Kammeraad. According to the method, an encapsulation solution is applied to soil contaminated with chemicals such as polynucleated aromatics and chlorinated hydrocarbons, in a quantity sufficient to form a saturated mixture of the soil and encapsulation solution. The encapsulation solution is capable of selectively attracting the soil contaminants and contains a non-ionic surfactant material, an anionic surfactant material and water. The mixture is applied to the soil for a time sufficient to permit the contaminants to dissociate from the soil and move into the encapsulation solution. After this occurs, much of the encapsulation solution and associated chemical contaminants can be removed from the soil A "Conditioning Composition and Catalyst for Use Therewith" is detailed in U.S. Pat. No. 5,741,750, dated Apr. 21, 1998, to David A. Hall The composition includes by weight 60–80% a mineral source such as granite, 20–40% basalt, 2–5% a bonding agent such as grey cement, 1–20% a mixed colloidal mineral source such as fine granite dust, and a catalyst provided in the ratio of at least one half liter of catalyst to at least 20 liters of water per 10 tons of composition. The catalyst is composed of water, calcium nitrate, urea, molasses, phosphoric acid and at least one non-ionic surfactant. U.S. Pat. No. 5,811,290, dated Sep. 22, 1998, to Ramesh Varadaraj, et al., describes a "Bioremediation Method of Hydrocarbon Contaminated Soils, Water, and/or Sludge using Urea-Surfactant Clathrates". The composition includes an adduct of urea with a non-ionic surfactant and a phosphorous source. The method provides for the application of a degradation-effective amount of a composition which has an N:P ratio ranging from 10:2 to about 10:0.5. The urea and non-ionic surfactant are present in the adduct in a weight ratio ranging from 98:2 to 75:25. The biodegradation method is carried out by the application of the composition to soil and provides a C:N:P ratio of 100:10:1 to 100:1:001. The C:N:P ratio is based on the weight percent of the hydrocarbon contaminate in the soil, water and/or sludge sites to be treated. "A Method and Composition for Stabilizing Soil and Process for Making the Same" is disclosed in U.S. Pat. No. 5,824,725, dated Oct. 20, 1998, to Shawqui M. Lahalih. The composition is a water-soluble chemical composition for use as a soil stabilizer, conditioner and structuring agent and includes a dispersing agent such as a polyanionic sulfonated urea-melamine formaldehyde condensate; an aggregating agent such as a non-ionic, water-soluble urea-formaldehyde condensate having a relative weight average molecular weights between 400 and 10,000 and a polydispersity between 2.5 and 10; a basic salt-like di-sodium tetra borate and/or a neutral salt such as sodium chloride; and a nitrogen, potassium or phosphorus-containing compound such as potassium nitrate, phosphoric acid or potassium dihydrogen orthophosphate. The composition is sprayed on the top of sand or soil with conventional equipment, to impart significant improvements in the sand or soil mechanical properties and erosion resistance to water and wind. U.S. Pat. No. 5,829,691, dated Nov. 3, 1998, to Roudel Gaudin, discloses a "Method and Apparatus for Washing Soil" which utilizes a water-based surfactant to separate contaminants from soil particles having a size within a predetermined range. After removing the surfactant/contaminant/water mixture from the soil particles, the soil is returned to the remediation site while the mixture is processed through an oil/water separator. Oil and contaminants are then disposed of while the water and surfactant are centrifuged, and the resulting supernatant is recycled back into the apparatus for re-use.

An object of this invention is to provide a composition and method for remediation of damaged or eroded soils.

Another object of this invention is to provide a soil remediation composition characterized by a solution having selected quantities of urea and calcium, which composition is applied to oil-damaged soil, oil-damaged soil and vegetation or eroded soil to cleanse the damaged soil and vegetation and accelerate or enhance vegetation growth and ground coverage on the damaged, eroded or sparsely-vegetated soil.

Still another object of this invention is to provide a soil remediation method for cleansing oil-damaged soil or soil and vegetation and enhancing vegetation growth and ground coverage on the damaged soil or on eroded or sparsely-vegetated soil.

Yet another object of this invention is to provide a soil remediation composition and method for rapidly remediating oil-damaged soil oil-damaged soil and vegetation, eroded soil or soil having sparse vegetation, by cleansing the damaged soil and vegetation and enhancing or accelerating vegetation growth and ground coverage on the damaged, eroded or sparsely-vegetated soil as the liquid composition percolates deep into the soil, which composition in a preferred embodiment is characterized by a substantially homogenous aqueous solution having selected quantities of urea, dimethylsulfoxide (DMSO), hydrated calcium nitrate and an ionic or non-ionic surfactant such as ether sulfate, and is typically sprayed on the damaged vegetation and soil or damaged, eroded or sparsely-vegetated soil.

A still further object of this invention is to provide a soil remediation composition which is capable of rapid and deep penetration of damaged, eroded or sparsely-vegetated soil for delivery of essential nitrogen to soil vegetation in order to facilitate accelerated or enhanced growth and coverage of the vegetation on the soil.

Another object of this invention is to provide a soil remediation composition characterized by a homogenous aqueous solution of urea, dimethylsulfoxide (DMSO), calcium nitrate, ether sulfate and liquid calcium solution for the cleansing and remediation of brine-damaged soil and vegetation.

Yet another object of this invention is to provide a soil remediation composition and method for remediating damaged trees, plants and bushes by applying the composition to the root systems of the damaged trees, plants and bushes.

SUMMARY OF THE INVENTION

These and other objects of the invention are provided in a soil remediation composition and method for rapidly remediating eroded, sparsely-vegetated or oil-damaged soil or oil-damaged soil and vegetation by applying the liquid composition to the vegetation and/or soil, to both cleanse the damaged soil and vegetation and enhance or accelerate vegetation growth and ground coverage on the damaged, eroded or sparsely-vegetated soil. In a preferred embodiment the soil remediation composition is characterized by a substantially homogenous aqueous solution of water and selected quantities of urea, dimethylsulfoxide (DMSO), hydrated calcium nitrate and ether sulfate. The liquid composition is typically sprayed on the damaged, eroded or sparsely-vegetated soil either full-strength or at a selected dilution, and rapidly penetrates the soil by operation of the surfactant component to the vegetation roots to cleanse the damaged vegetation and soil and promote plant nitrogen assimilation and rapid growth and ground coverage of vegetation on the damaged or eroded soil The treated soil is typically seeded to enhance vegetation growth and coverage. A small quantity of dye is typically added to the composition to color and facilitate uniform visual distribution of the composition over the damaged or eroded soil or damaged soil and vegetation. In the case of wet oil spills, the soil remediation composition activates hydrocarbon-consuming bacteria, and the treated soil typically is tilled or disced using organic matter such as hay to aerate the soil, enhance soil recovery and prevent soil erosion. In a second embodiment a liquid calcium solution is mixed with the soil remediation composition for neutralizing ground sodium in the treatment of brine or salt water spills.

DESCRIPTION OF THE PREFERRED EMBODIMENTS

In a preferred embodiment the soil remediation composition of this invention is characterized by a substantially homogenous aqueous solution having selected quantities of urea, dimethylsulfoxide (DMSO), calcium and ether sulfate The chemical ingredients are typically mixed or agitated in a blending vat at room temperature to achieve a substantially homogenous solution. The resulting composition solution is typically sprayed either full-strength or at a selected aqueous dilution onto oil-damaged soil, oil-damaged vegetation and soil or eroded or sparsely-vegetated soil, from a pump truck through high-pressure valves in the case of widespread soil erosion, soil damage or vegetation and soil damage, or through a hand, shoulder or back-supported compressed air sprayer when more localized or scattered treatment is required. The treated soil is typically seeded to enhance vegetation growth and coverage. In the case of wet oil spills, the treated soil is typically tilled or disced using organic matter such as hay, to aerate the soil, enhance soil recovery and prevent further soil erosion, prior to seeding. The applied composition runs off any existing vegetation and quickly penetrates or percolates through the soil to the roots of the vegetation to cleanse the vegetation, soil and vegetation roots in the case of oil spills, as well as to facilitate vegetation rejuvenation, growth and ground coverage in damaged, eroded or sparsely-vegetated soil by providing nitrogen to nitrogen-fixing bacteria in the soil and vegetation roots. In a second embodiment a liquid calcium solution such as that sold by Lafferty-DeLuca Services, Inc., of Lafayette, La., under the trademark LCA-II, is mixed with the soil remediation composition for neutralizing ground sodium in the treatment or remediation of brine or salt water spills.

The chemical components of the soil remediation composition of this invention enable the composition to rapidly penetrate treated soil and cleanse the soil and any existing vegetation, as well as to provide nitrogen to the soil in a suitable form for growth and metabolism of the existing vegetation or subsequently-applied grass or vegetation seeds. The urea component of the soil remediation composition provides nitrogen to nitrogen-fixing soil and root bacteria, which initiate bio-remediation of the vegetation within several hours of soil treatment by converting the urea into nitrates, an essential source for plant assimilation of nitrogen. The urea also activates hydrocarbon-consuming soil bacteria which consume and clean oil deposits in the case of oil spills. While ammonia or some other compound other than urea can be used as a source of soil nitrogen, urea is the preferred nitrogen source since it is safe to store and handle and is "environmentally friendly". The calcium nitrate component neutralizes the soil and speeds the rate of urea percolation or penetration by imparting additional weight to the composition. Other water-soluble calcium salts such as calcium carbonate in non-exclusive particular, can be used instead of calcium nitrate. The ether sulfate functions as a surfactant, reducing surface tension to facilitate rapid penetration of the composition into the soil, and also cleanses oil deposits from the vegetation, soil and vegetation roots as the composition runs off the vegetation and percolates through the soil. While ether sulfate is the preferred surfactant for the soil remediation composition, any other ionic or non-ionic surfactant which is capable of reducing surface tension in the treated soil to promote soil penetration and which is "environmentailly-friendly" can be used instead. The dimethylsulfoxide (DMSO) acts as a natural soil penetrator and carries the other composition components deep into the soil and vegetation roots, where the nitrogen-fixing bacteria produce the nitrates from the urea. While the calcium and urea without the other chemical components in water solution are sufficient for soil penetration and nitrogen delivery to the vegetation, the DMSO and ether sulfate components enhance soil penetration and impart soil and vegetation cleansing characteristics, respectively, to the composition. In a preferred embodiment a small quantity of dye such as TADCO (trademark) Alpha Blue (A7000-100 dye), in non-exclusive particular, is mixed with the composition prior to application, to color and facilitate uniform visual distribution of the composition over the damaged soil and vegetation or damaged, eroded or sparsely-vegetated soil The soil remediation composition is typically prepared in a mixing or blending vat in 300-gallon batches. The blending vat is typically provided with gear-type pumps such as WORTHINGTON (trademark) pumps for pulverizing solid urea pellets prior to mixing, as hereinafter described. After the water is poured into the vat, the urea is typically added as pellets and crushed and mixed or agitated in the water at room temperature until a substantially homogenous solution is obtained. After the hydrated calcium is added in typically liquid form as hydrated calcium sulfate to the solution, the typically liquid DMSO, ether sulfate and dye are added to the vat, and the mixture is agitated for about 30 minutes at room temperature to achieve a substantially homogenous solution. The resulting composition solution is typically stored in 55-gallon drums or 300-gallon polycore stock tanks, as desired, prior to application.

In treating soil subjected to widespread soil and vegetation oil damage or soil erosion, the soil remediation composition is typically poured into a pump truck and applied either full-strength or at various aqueous dilutions, depending on the degree of soil and vegetation damage or erosion, and is typically applied in a quantity of about 55 gallons per 1–2 acres. The full-strength or diluted composition is typically administered using hand-held or shoulder-supported compressed air spray bottles of suitable design when more localized or scattered application of the composition is required. For remediation of wet oil spills, the composition is typically applied either full-strength or at a dilution of about 1 part composition per 20 parts water, and typical dilution for remediation of eroded soil is about 1 part composition per 30–50 parts water, with a higher concentration of composition applied to more severely-eroded soil. In the second embodiment of the soil remediation composition, the calcium solution is mixed with the stock soil remediation composition, typically in the pump truck prior to application, in order to neutralize the ground sodium in the case of brine or salt-water spill remediation. The stock soil remediation solution is added to the calcium solution typically at a concentration of about 10% stock solution, or about 5 gallons of stock solution per 50 gallons of calcium solution. In treating the root systems of trees which have been damaged by oil or salt spills or soil erosion, the soil remediation composition is sprayed on the ground beneath the tree or bushes as far out as the branches of the tree or bushes reach, typically at a concentration of about 1 part soil remediation composition per 30 parts water, after which the treated soil is preferably saturated with water to enhance ground penetration.

The invention will be better understood by consideration of the following examples:

EXAMPLE 1

Into a blending vat was placed about 1636 lbs. of tap water, about 655 lbs. of urea [$CO(NH_2)2$] and about 355 lbs. of hydrated calcium nitrate [$Ca(NO_3)2H_2O$], respectively. The ingredients were mixed in the vat at room temperature for about 30 minutes to obtain a substantially homogenous solution, and an undiluted portion of the resulting liquid composition was sprayed full-strength onto soil and vegetation which had been heavily damaged by a wet oil spill. The treated soil was tilled using hay to aerate the soil enhance soil recovery and prevent soil erosion, and then seeded with grass seeds. Grass growth appeared within about 4–5 days, and the treated area was covered with grass growth after about 7–10 days.

EXAMPLE 2

Into a blending vat was placed about 1636 lbs. of tap water, about 655 lbs. of urea [$CO(NH_2)2$], about 44 lbs. of dimethylsulfoxide (DMSO, $C_2H_6OS$), about 355 lbs. of calcium [$Ca(NO_3)2H_2O$], about 55 lbs. of ether sulfate (HF-100C) and about 6 oz. of TADCO (trademark) Alpha Blue (A7000-100 dye). The ingredients were mixed at room temperature for about 30 minutes to obtain a substantially homogenous 300-gallon solution, and the resulting liquid composition was stored in multiple 55-gallon drnms. Fifty-five gallons of the composition were initially poured in a pump truck, and then diluted about 1 part soil remediation composition per 20 parts using tap water and mixed in the pump truck. The diluted composition was sprayed from the pump truck over 1–2 acres of soil which had sustained light to moderate damage caused by an oil spill. The treated soil was disced with hay to aerate the soil, enhance soil recovery and prevent soil erosion, and grass seeds were sown in the treated soil Grass growth appeared in about 4–5 days, and complete grass coverage of the soil was observed in about 7–10 days. Oil was substantially absent from the treated soil after about 2 weeks.

EXAMPLE 3

Into a blending vat was placed about 1636 lbs. of tap water, about 655 lbs. of urea [$CO(NH_2)2$], about 44 lbs. of dimethylsulfoxide (DMSO, $C_2H_6OS$), about 355 lbs. of calcium [$Ca(NO_3)2H_2O$], about 55 lbs. of ether sulfate (HF-100C) and about 6 oz. of TADCO (trademark) Alpha Blue (A7000-100) dye. The ingredients were mixed at room temperature for about 30 minutes to obtain a substantially homogenous 300-gallon solution, and the resulting liquid composition was stored in multiple 55-gallon drums. Fifty-five gallons of the composition were initially poured in a pump truck and then mixed at about 1 part composition per 10 parts with a liquid calcium solution sold by Lafferty-DeLuca Services, Inc., of Lafayette, La., under the trademark LCA-II. The composition mixture was sprayed from the pump truck over 1–2 acres of soil which sustained heavy damage caused by a salt water spill. Grass seeds were then sown in the soil. Grass growth appeared in about 4–5 days, and complete grass coverage of the soil was observed in about 7–10 days.

EXAMPLE 4

Into a blending vat was placed about 1636 lbs. of tap water, about 655 lbs. of urea [$CO(NH_2)2$], about 44 lbs. of dimethylsulfoxide (DMSO, $C_2H_6OS$), about 355 lbs. of calcium [$Ca(NO_3)2H_2O$], about 55 lbs. of ether sulfate (HF-100C) and about 6 oz. of TADCO (trademark) Alpha Blue (A7000-100) dye. The ingredients were mixed at room temperature for about 30 minutes to obtain a substantially homogenous 300-gallon solution, and the resulting liquid composition was stored in multiple 55-gallon drums. Fifty-five gallons of the composition were initially poured in a pump truck and then diluted about 1 part composition per 20 parts tap water, and the diluted composition was mixed at a concentration of about 1 part diluted composition per 10 parts using a liquid calcium solution sold by Lafferty-DeLuca Services, Inc., of Lafayette, La., under the trademark LCA-II, and mixed in the pump truck. The composition mixture was sprayed from the pump truck over 1–2 acres of soil which sustained light to moderate damage caused by a salt water spill. Grass seeds were then sown in the soil. Grass growth appeared in about 4–5 days, and complete grass coverage of the soil was observed in about 7–10 days.

EXAMPLE 5

Into a blending vat was placed 1636 lbs. of tap water, 655 lbs. of urea [$CO(NH_2)2$], 44 lbs. of dimethylsulfoxide (DMSO, $C_2H_6OS$), 355 lbs. of calcium [$Ca(NO_3)2H_2O$], 55 lbs. of ether sulfate (HF-100C) and 6 oz. of TADCO (trademark) Alpha Blue (A7000-100 dye). The ingredients were mixed at room temperature for about 30 minutes to obtain a substantially homogenous 300-gallon solution, and the resulting liquid composition was stored in multiple 55-gallon drums. Fifty-five gallons of the composition were initially poured in a pump truck, and then diluted about 1 part composition per 30–50 parts tap water and mixed in the pump truck. The diluted composition was sprayed from the pump truck over 1–2 acres of soil which had sparse vegetation due to soil erosion, to enhance ground vegetation growth. Grass growth appeared in about 4–5 days, and complete grass coverage of the soil was observed in about 7–10 days.

EXAMPLE 6

Into a blending vat was placed 1636 lbs. of tap water, 655 lbs. of urea [$CO(NH_2)2$], 44 lbs. of dimethylsulfoxide (DMSO, $C_2H_6OS$), 355 lbs. of calcium [$Ca(NO_3)2H_2O$], 55 lbs. of sulfate (HF-100C) and 6 oz. of TADCO (trademark) Alpha Blue (A7000-100 dye). The ingredients were mixed at room temperature for about 30 minutes to obtain a homogenous 300-gallon solution, and the resulting liquid composition was stored in multiple 55-gallon drums. The composition was later diluted about 1 part composition per 30 parts tap water, and some of the diluted composition was poured into a spray canister or bottle. The composition was sprayed from the spray bottle over scattered areas of soil in which the root systems of trees were embedded and which soil and roots had been damaged by an oil spill. The treated soil was saturated with water to enhance soil penetration of the composition.

It will be appreciated by those skilled in the art that the soil remediation composition of this invention is "environmentally-friendly", safe to handle and store and can be used to rapidly remediate soil erosion, as well as soil, vegetation and tree or bush root damage due to spillage of petroleum hydrocarbons or salt water. The soil remediation composition enhances vegetation growth and can be used to prevent soil erosion on right-of-ways such as pipelines and highlines, for example. The composition can also be used to promote vegetation recovery and growth in bodies of water such as ponds, pits, sloughs, etc. It has surprisingly been found that the various composition components act synergistically to facilitate deep and fast-acting soil and vegetation cleansing, oil consumption and rapid nitrogen delivery to existing soil vegetation, resulting in significantly enhanced and accelerated vegetation cleansing, growth and coverage of the treated soil. While grass or vegetation growth and coverage of the treated soil was generally observed within about 7–14 days, the rapidity of vegetation rejuvenation and oil consumption using the soil remediation composition depends on many variables such as severity of the soil erosion or soil and vegetation damage, the chemical composition of the treated soil and the quantity of oil or salt water spilled on the soil. It is understood that while the aqueous urea, DMSO, calcium nitrate and dye can be present in the composition solution in a wide range of weight proportions to achieve the functional soil remediation composition, a typical 55-gallon unit of the composition includes about 140 lbs. of urea, 23 lbs. of DMSO, 65 lbs. of calcium, 10 lbs. of ether sulfate and 1 oz. of dye, dissolved in about 300 lbs. of tap water. Furthermore, any type of water-soluble dye is suitable for coloring the soil remediation composition to facilitate uniform spread or distribution of the composition over damaged or eroded soil.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A soil remediation composition comprising a homogenous solution including urea, dimethyl sulfoxide and calcium.

2. The soil remediation composition of claim 1 comprising a dye dissolved in said solution for coloring said solution.

3. The soil remediation composition of claim 1 comprising a surfactant dissolved in said solution.

4. The soil remediation composition of claim 3 comprising a dye dissolved in said solution for color said solution.

5. The soil remediation composition of claim 3 wherein said surfactant is ether sulfate and comprising a dye dissolved in said solution for coloring said solution.

6. The soil remediation composition of claim 1 wherein said solution comprises an aqueous solution.

7. The soil remediating composition of claim 6 comprising a dye dissolved in said solution for coloring said solution.

8. The soil remediation composition of claim 6 comprising ether sulfate dissolved in said solution.

9. The soil remediation composition of claim 8 comprising a dye dissolved in said solution for coloring said solution.

10. A soil remediation composition comprising water and urea, dimethyl sulfoxide, calcium and ether sulfate dissolved in said water to form a homogenous aqueous solution.

11. The soil remediation composition of claim 10 comprising a dye dissolved in said solution for coloring said solution.

* * * * *